United States Patent [19]
Morishita et al.

[11] Patent Number: 5,396,480
[45] Date of Patent: Mar. 7, 1995

[54] METHOD AND APPARATUS FOR RECORDING INFORMATION USING AN ENERGY BEAM OF POWER LEVELS CHANGED STEPWISE

[75] Inventors: Naoki Morishita; Naomasa Nakamura, both of Yokohama; Katsumi Suzuki, Tokyo; Tadashi Kobayashi, Chiba, all of Japan

[73] Assignee: Kabushiki Kaisha Toshiba, Kawasaki, Japan

[21] Appl. No.: 156,826

[22] Filed: Nov. 24, 1993

[30] Foreign Application Priority Data

Nov. 24, 1992 [JP] Japan ................... 4-313454

[51] Int. Cl.⁶ ............................... G11B 7/00
[52] U.S. Cl. ...................... 369/116; 369/13; 369/100; 369/124
[58] Field of Search ............ 369/116, 100, 102, 112, 369/13, 124

[56] References Cited

U.S. PATENT DOCUMENTS

| | | | |
|---|---|---|---|
| 4,939,717 | 7/1990 | Ohno et al. | 369/116 |
| 5,084,857 | 1/1992 | Miyauchi et al. | 369/116 |
| 5,123,007 | 6/1992 | Miyauchi et al. | 369/100 |
| 5,257,256 | 10/1993 | Terao et al. | 369/116 |
| 5,323,374 | 6/1994 | Arsi et al. | 369/116 |

FOREIGN PATENT DOCUMENTS

3185629  8/1991  Japan .

*Primary Examiner*—Eugene R. LaRoche
*Assistant Examiner*—Tan Nguyen
*Attorney, Agent, or Firm*—Cushman Darby & Cushman

[57] ABSTRACT

A laser beam is radiated on a recording medium such as a phase transition type optical disk to change optical characteristics depending on a change in arrangement of atoms in a recording layer of the recording medium so as to repetitively record/erase information represented by the lengths of optical marks, the recording power of the laser beam radiated to record the information in the recording medium is changed stepwise in two or more power levels sequentially higher than an erasure power level of a laser beam radiated to erase the information recorded in the recording medium.

11 Claims, 10 Drawing Sheets

METHOD AND APPARATUS FOR RECORDING INFORMATION USING AN ENERGY BEAM OF POWER LEVELS CHANGED STEPWISE

BACKGROUND OF THE INVENTION

1. Field of the Invention

The present invention relates to a method and apparatus for recording information in which irradiation of an energy beam such as a laser beam or an electron beam causes a change in optical characteristics caused by a change in arrangement of atoms in a recording layer of a recording medium such as an optical disk so as to repetitively record and erase information represented by the lengths of optical marks.

2. Description of the Related Art

Figure 13:
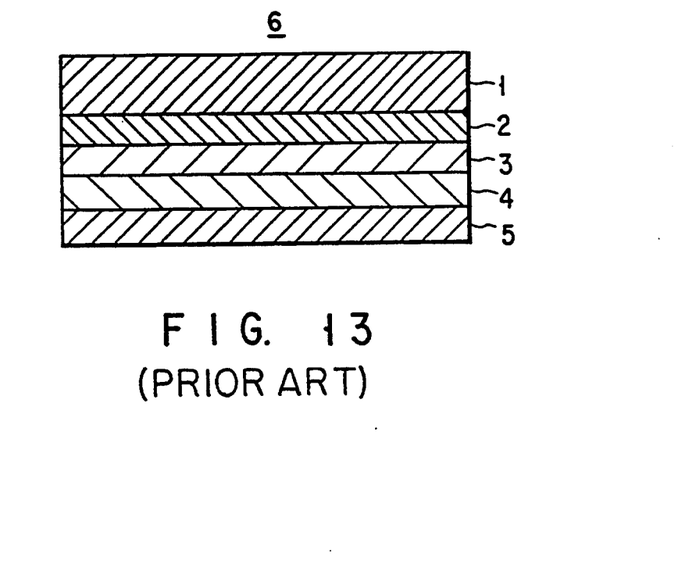
FIG. 13 is a longitudinal sectional view showing the arrangement of a recording medium in which information can be recorded/erased.

Most of recording media (e.g., phase transition type optical disks) which are conventionally and popularly developed and capable of recording/erasing information have a structure shown in FIG. 13. That is, a substrate 1 consists of glass or a plastic material (e.g., a polymethyl methacrylate resin or a polycarbonate resin), and an inorganic protective layer (e.g., a metal or metalloid oxide film, a fluoride film, a sulfide film, a nitride film, or the like) 2, a recording layer 3, an inorganic protective layer 4, and a reflective layer 5 are stacked on one surface of the substrate 1 to form a recording medium 6. Note that the inorganic protective layers 2 and 4 are formed to prevent a change in the recording layer 3 over time. The recording layer 3 is formed by a deposition method such as vacuum deposition or sputtering.

Information can be recorded/erased using the above recording medium 6 as follows. A laser beam is radiated on the entire surface of the recording medium 6 to heat the recording medium 6 and to set the recording layer 3 with high crystallinity (state in which atoms are relatively regularly arranged, and this state will be referred to as a crystalline state hereinafter). In order to record information, a short, strong pulse beam is radiated on the recording medium 6 to heat and abruptly cool the recording layer 3. At this time, a portion irradiated with the pulse beam is set to low crystallinity (state in which atoms are irregularly arranged, this state is to be referred to as an amorphous state hereinafter).

In both the crystalline and amorphous states, the structures of the arrangements of atoms are different from each other. For this reason, optical characteristics (transmittance and reflectance) are changed, so that information can be recorded. In this manner, the recorded information can be erased such that a long, weak pulse beam is radiated on the recording portion to heat and gradually cool the recording portion, because the state of the recording portion is returned to the crystalline state, i.e., an original state.

The above state can be realized by a so-called overwrite operation. According to the overwrite operation, a laser beam obtained by superposing a short, strong pulse beam of a recording power level on a weak continuous light beam of an erasure power level as shown in FIG. 14 is used, and a new recording portion is formed while an old recording portion (amorphous state) is erased (set in a crystalline state).

Figure 14:
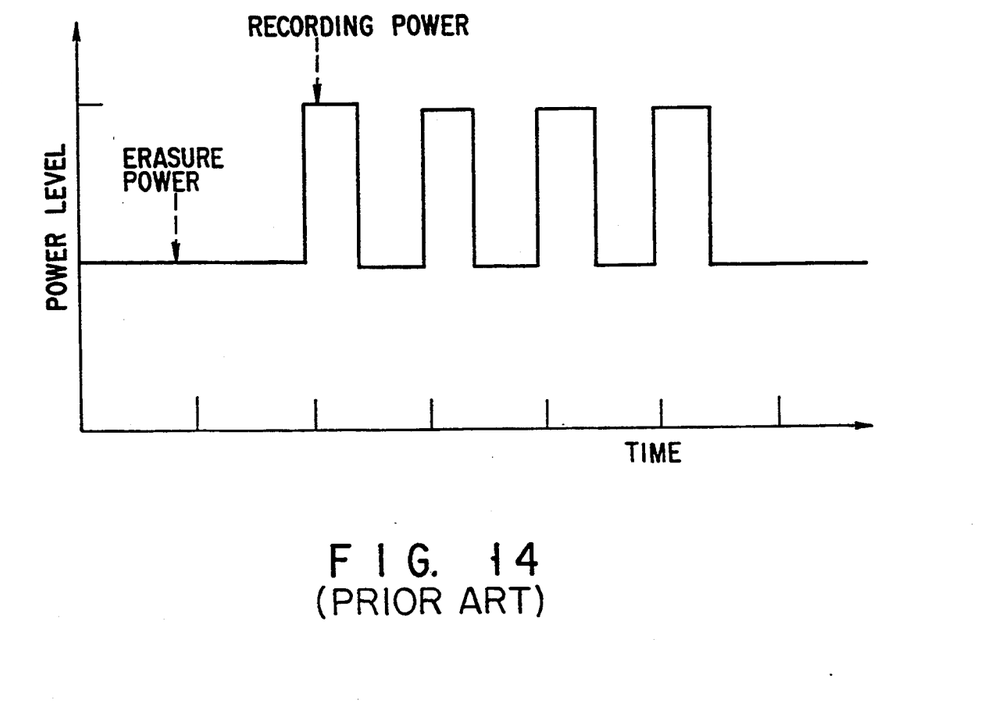
FIG. 14 is a waveform view for explaining a conventional recording power level.

In order to record information represented by the lengths of optical marks in a recording medium using a pulse beam having the rectangular waveform shown in FIG. 14, the recording layer of a portion irradiated with the laser beam generates heat and is melted. In this case, since the laser beam has a high power, an amount of heat generated by the recording layer is larger than the amount of latent heat required to melt the recording layer and the flow rate of heat to the reflecting and protective layers, and heat is accumulated in the recording layer. In completion of irradiation of the recording pulse beam, a melted region extends in a direction perpendicular to the recording tracks of the phase transition type optical disk (recording medium), and the shape of each recording mark becomes a so-called water-drop shape having a thin front end portion and a thick rear end portion. When the mark having the water-drop shape is reproduced as described above, the leading and trailing edges of the waveform of the reproduced signal have different shapes, and the reproduced signal is distorted. For this reason, jitters caused by a slight difference between the phases of a recording signal and the reproduced signal are increased, and recording and reproduction errors are increased, thereby causing a decrease in margin.

SUMMARY OF THE INVENTION

It is an object of the present invention to provide a method and apparatus for recording information in which a heat amount accumulated in the entire recording mark is uniformed to suppress distortion of a mark shape, and errors and jitters are decreased, thereby recording information at high precision.

According to an aspect of the present invention, there is provided a method for forming one optical mark to record information on a recording medium, wherein the optical mark may be erased from the recording medium by applying a first light beam having a first energy intensity BP and the optical mark may be reproduced from the recording medium by applying a second light beam having a second energy intensity RP lower than the first energy intensity BP, the method comprising the steps of:

a first irradiating step for irradiating a third light beam having the third energy intensity higher than the first energy intensity BP;

a second irradiating step for continuously irradiating a fourth light beam having a fourth energy lower than the third energy intensity and higher than the first energy intensity BP after the irradiation of the third light beam; and a third irradiating step for continuously irradiating a fifth light beam having a fifth energy intensity LP satisfying the following equation after the irradiation of the fourth light beam.

$$0.1 \leq \frac{LP - RP}{BP - RP} \leq 0.9.$$

According to another aspect of the present invention, there is provided an apparatus for recording information in which an energy beam, output from an energy beam generating means is radiated on a recording medium to change optical characteristics so as to record information represented by lengths of optical marks formed in the recording medium, comprising:

recording drive current generating means, in which drive current values corresponding to a plurality of recording power levels of the energy beam radiated to record information in the recording medium are set in advance, for generating a plurality of recording drive currents;

erasure drive current generating means, in which a drive current value corresponding to an erasure power level of an energy beam radiated to erase the information recorded in the recording medium is set in advance, for generating an erasure drive current;

correction power drive current generating means, in which a drive current value corresponding to an energy beam having a power level lower than the erasure power level of the energy beam radiated to erase the information recorded in the recording medium and higher than a reproduction power level of an energy beam radiated to reproduce the information recorded in the recording medium is set in advance, for generating a correction power drive current immediately after the energy beam radiated to record the information in the recording medium;

timing generating means for sequentially outputting timing signals for determining output timings of the recording power level;

selecting means for sequentially selecting outputs from the recording drive current generating means in response to the timing signals output from the timing generating means;

adding means for adding an output, selected by the selecting means, from the recording drive current generating means and an output from the erasure drive current generating means or the correction power drive current generating means; and means for controlling to drive the energy beam generating means in accordance with an output from the adding means.

According to the present invention, the recording power of an energy beam radiated to record information is changed in two or more power levels higher than an erasure power level of an energy beam radiated to erase the recorded information. For example, an energy beam at a high power level is radiated on a recording start portion and causes the irradiated portion to abruptly generate heat to melt a recording layer of the recording medium, and the power level of an energy beam is decreased in an intermediate recording portion in consideration of a heat accumulation effect of the recording start portion. In this manner, a heat amount of the entire recording layer can be uniformed, distortion of each mark shape can be suppressed, and errors and jitters can be decreased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Embodiments of the present invention will be described with reference to the accompanying drawings.

The first embodiment will be described below.

Figure 2:
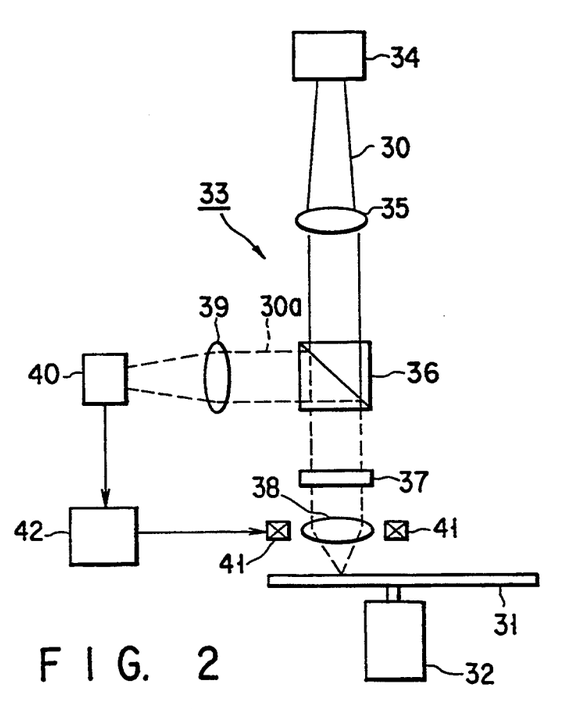
FIG. 2 is a schematic view showing the arrangement of an apparatus for recording information according to the embodiment of the present invention.

FIG. 2 schematically shows the arrangement of an apparatus for recording information according to one embodiment of the present invention. In FIG. 2, a recording medium (e.g., a phase transition type optical disk) 31 is fixed to a spindle motor 32 and rotated at a predetermined rotational speed.

The disk 6 shown in FIG. 13 may be used as the disk 31, and a detailed description of an arrangement thereof will be omitted because the arrangement is not different from the disk 6.

An optical system 33 for focusing a laser beam 30 on the recording medium 31 is arranged above the recording medium 31. That is, the laser beam 30 output from a semiconductor laser oscillator 34 is collimated into a parallel beam by a collimator lens 35, and the resultant beam is focused on the recording medium 31 by an objective lens 38 through a beam splitter 36 and a λ/4 plate 37. A beam reflected by the recording medium 31 is split by the beam splitter 36, and a split beam 30a is incident on an optical receiver 40 through a detection lens 39 and converted into an electrical signal, i.e., a detection signal. An output signal from the optical receiver 40 is also supplied to a servo circuit 42 for causing a current to flow in a drive coil 41 for driving the objective lens 38. In this manner, the distance between the optical system 33 and the recording medium 31 can always be kept constant, and a focused spot can be formed on the surface of the recording medium 31.

Figure 3:
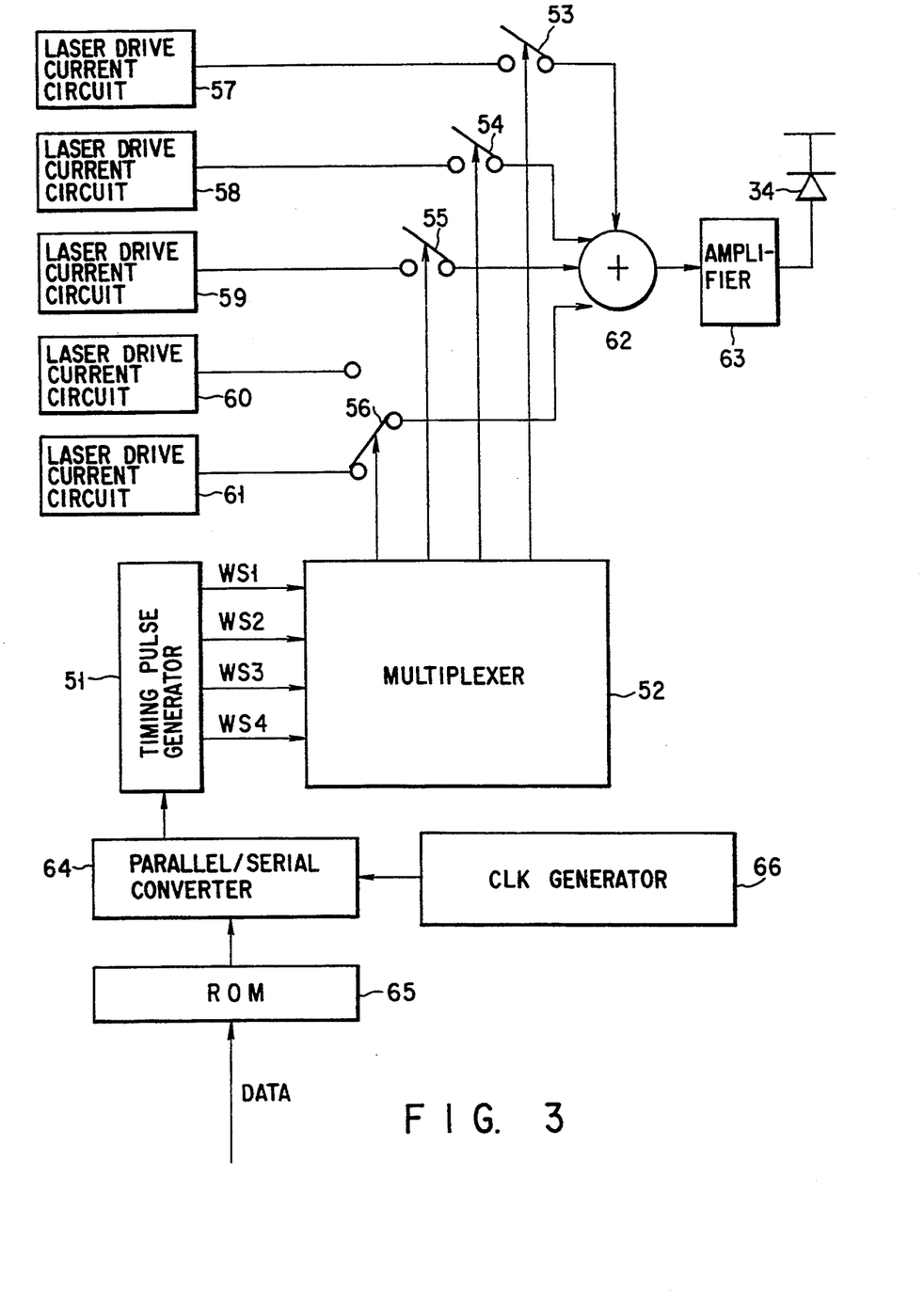
FIG. 3 is a schematic block diagram showing the main part of an electric circuit of the apparatus for recording information.

FIG. 3 schematically shows the main part of an electric circuit of the above-described apparatus for recording information. In this embodiment, although the power of a laser beam output from the semiconductor laser oscillator 34 is controlled to be changed to have three levels, the number of levels can be arbitrarily set. In FIG. 3, the duration of a power at each level and the duration of a correction power level (to be described later) are set in a timing pulse generator 51 in advance.

Data transferred from a host (not shown) is subjected to modulation such as 1–7 code modulation or 2–7 code modulation by a modulation ROM 65 so as to be modulated data. The modulated data is synchronized with a channel clock output from a clock generator 66, and is converted into serial data by a parallel-serial converter 64. The serial data is supplied to the timing pulse generator 51 and is to be called channel data hereinafter.

Figure 6A:
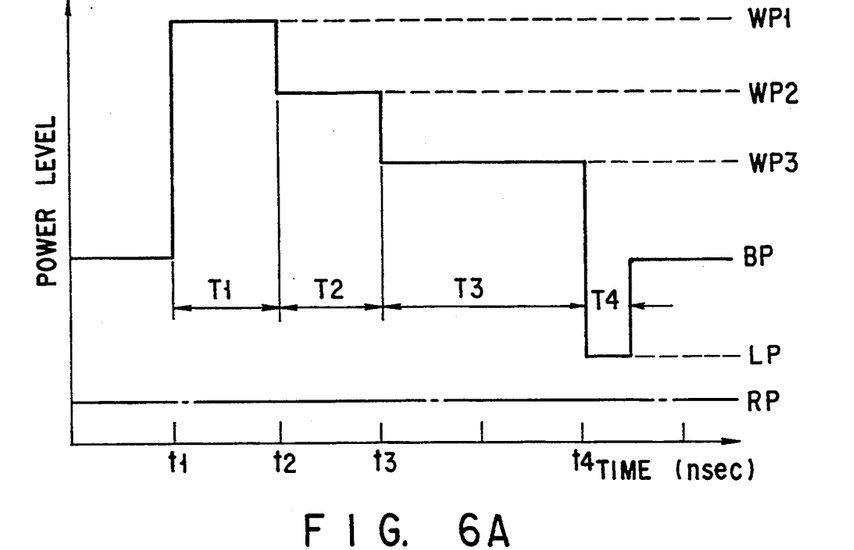
FIGS. 6A and 6B are waveform charts respectively showing timings at which power levels are changed stepwise in recording information.

When the channel data is input to the generator 51, pulses are output to a timing terminal WS1 of a first write laser power, a timing terminal WS2 of a second write laser power, and a timing terminal WS3 of a third write laser power for the set durations T1, T2, T3 of the pulses at write timings, respectively (see FIG. 6A). The pulse time T3 of the third write laser power is obtained by subtracting the durations T1, T2 of the first and second laser pulses from a high-level time (T1+T2+T3) of the input channel data. A fourth timing pulse is output to a timing terminal WS4 for the set duration T4 of the correction power level.

The signals, output from the timing pulse generator 51 to the timing terminals WS1, WS2, WS3, and WS4, are input to a multiplexer 52. The multiplexer 52 selectively controls switches 53, 54, 55, and 56 in accordance with the signals of the timing terminals WS1, WS2, WS3, and WS4.

Output laser power levels are set in write laser drive current circuits 57, 58, and 59, a correction pulse laser drive current circuit 60, and an erasure power laser drive current circuit 61 in advance, respectively. A laser drive current from the laser drive current circuit connected to a switch selected by the multiplexer 52 is supplied to an adder 62, and the current is added to a laser drive current from the erasure power laser drive current circuit 61.

An output current from the adder 62 is amplified by an amplifier 63 and supplied to the semiconductor laser oscillator (e.g., a laser diode) 34 to drive the semiconductor laser oscillator 34. In this manner, a laser beam is radiated and output from the semiconductor laser oscillator 34 for a set duration at a set power level.

When no write laser power is selected, only an erasure power is selected, and a laser beam having an erasure power is output from the semiconductor laser oscillator 34.

Figure 6B:
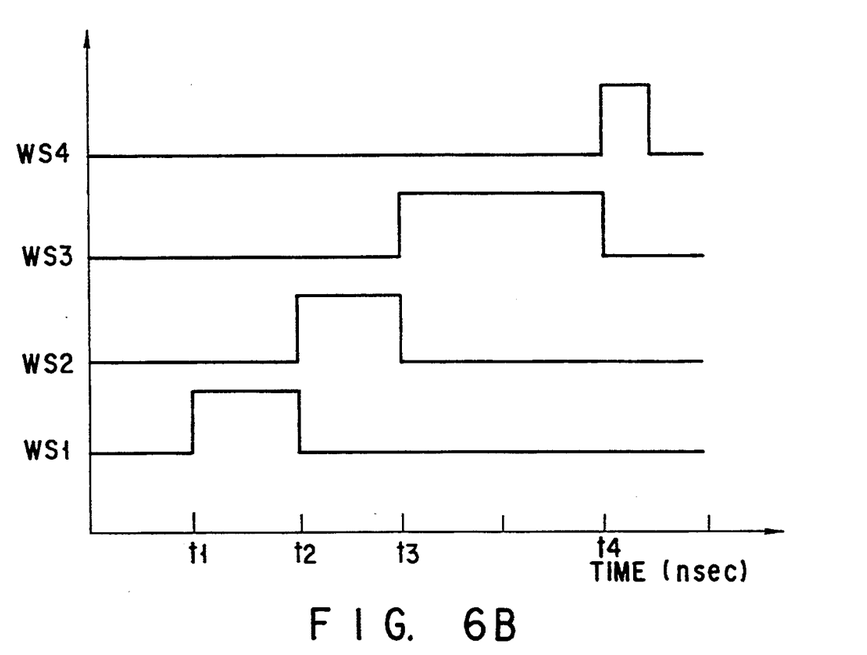

FIG. 6A shows the waveform of practical laser powers, and FIG. 6B shows signals at the timing terminals WS1, WS2, WS3, and WS4 of the respective laser power levels. When the signal of the timing terminal WS1 goes to high level at time t1, the switch 53 is turned on, and a laser beam is output at a first recording power level WP1 for a time T1 (nsec). After the signal of the timing terminal WS1 goes to low level at time t2, the signal of the timing terminal WS2 goes to high level, the switch 54 is turned on, and a laser beam is output at a second recording power level WP2 for a time T2 (nsec). Finally, when the signal of the timing terminal WS3 goes to high level at time t3, the switch 55 is turned on, and a laser beam is output at a third recording power level WP3 for a time T3 (nsec).

Subsequently, when the signal of the timing terminal WS4 goes to high level at time t4, the switch 56 selects the correction power laser drive current circuit 60, and a laser beam is output at a low power level (correction power level) LP lower than an erasure power level BP for a time duration T4 (nsec). In FIG. 6A, reference symbol RP represents a reproduction power level (read power level) obtained when information recorded in the recording medium 31 is reproduced.

A waveform having no correction power can be obtained such that the duration T4 (nsec) of the correction power level (low-power level) LP is set to be "0".

Figure 4:
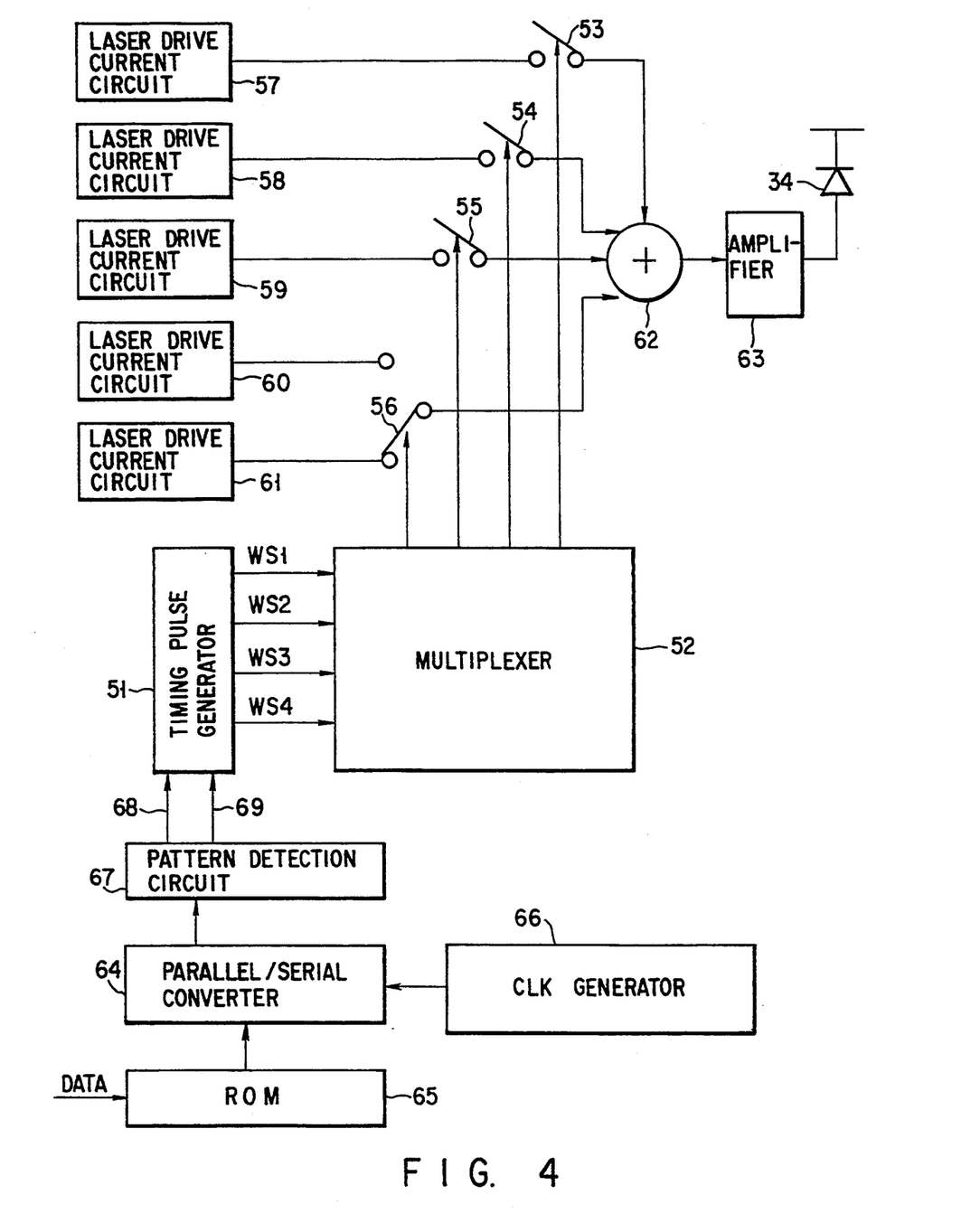
FIG. 4 is a block diagram showing a modification of the circuit shown in FIG.
Figure 5:
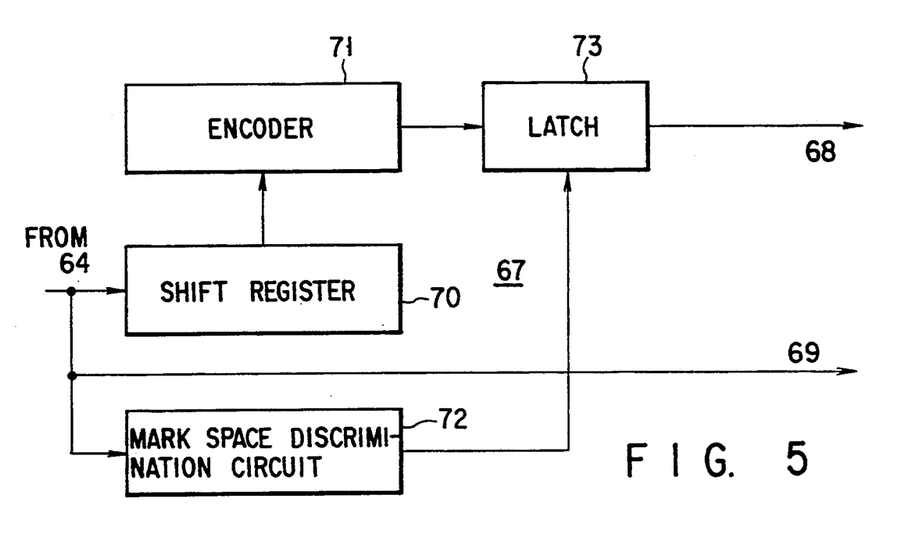
FIG. 5 is a block diagram for causing a pulse width to be variable depending on a mark length.

In order to change the duration T1 (nsec) of the first recording power level WP1 depending on the length of a mark being recorded, the following method is used. That is, as shown in FIG. 4, a pattern detection circuit 67 is connected between the input terminal of the timing pulse generator 51 and the output terminal of the parallel-serial convertor 64, and the length of the mark being recorded is detected, so that the set value of the timing pulse generator 51 is changed in accordance with the length of the mark. FIG. 5 shows the details of the pattern detection circuit 67 in FIG. 4. In FIG. 5, channel data from the parallel-serial converter 64 is shifted in a shift register 70 in synchronism with a channel clock and converted into 8-bit data, and the 8-bit data is supplied to an encoder 71 to be converted into a 3-bit select signal representing each mark.

The channel data from the parallel-serial converter 64 is supplied to a mark space discrimination circuit 72, and a mark space discrimination signal is supplied to a latch 73. Therefore, an output from the encoder 71 is output to the timing pulse generator 51 as a signal 68 in synchronism with the mark-space discrimination signal. Note that the channel data from the parallel-serial converter 64 is directly output as a signal 69 to the timing pulse generator 51. When the output from the encoder 71 is to be output to the timing pulse generator 51 via the latch 73, a timing pulse having a pulse width corresponding to the pattern length of the channel data is generated. In this manner, the pulse width can be changed in accordance with the length of a mark being recorded.

Figure 7:
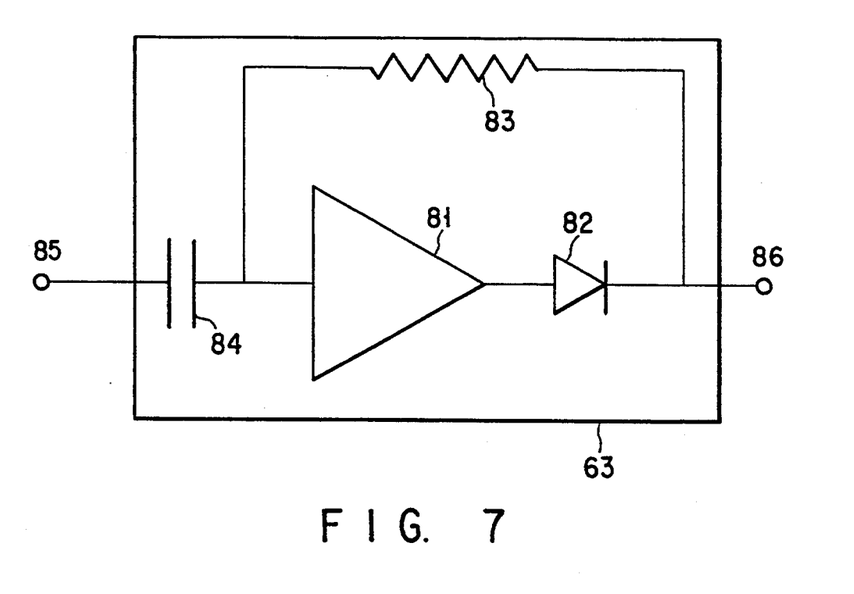
FIG. 7 is a view showing a control circuit for the emission intensity of a laser diode.

Although the emission intensity of a laser diode is discontinuously or stepwisely changed due to discontinuity of a drive current, the emission intensity can be continuously changed. A circuit for continuously changing the emission intensity is shown in FIG. 7. This circuit is also used as the amplifier 63 in each of FIGS. 3 and 4. The circuit is a differentiation circuit constituted by an operational amplifier 81, a diode 82, a feedback resistor 83, and a capacitor 84. When a drive current having a rectangular waveform is input to an input terminal 85, a differentiated waveform signal is output from an output terminal 86. Therefore, the emission intensity of the laser can be continuously changed.

The second embodiment will be described below.

In this embodiment, an experiment for confirming the effectiveness of the method of the present invention using the apparatus for recording information described in the first embodiment was performed. As a phase transition type optical disk 31 serving as a recording medium 6 having the arrangement shown in FIG. 13, an optical disk obtained such that a znS-SiO$_2$ film (1,500 Å) 2, a GeSbTe film (200 Å) 3, a ZnS-SiO$_2$ film (200 Å) 4, and an Al-alloy film (1,000 Å) 5 were sequentially stacked on the substrate by sputtering was used.

The optical disk 31 was rotated in FIG. 2 at a linear velocity of 5 m/s, and recording was performed while the optical disk was subjected to focus servo control and tracking servo control. The well-known, so-called (1, 7) code modulation was performed as a modulation method of recording, so that a channel frequency at which a minimum mark length was set to be 1 μm was determined.

As a prior art, jitter amounts as functions of a recording power and an erasure power obtained when recording was performed by a recording power waveform constituted by a normal rectangular wave was measured. A curve A1 in FIG. 8 represents a jitter amount as a function of an erasure power obtained when recording is performed at a recording power of 15 mW, and a curve B1 in FIG. 9 represents a jitter amount as a function of a recording power obtained by an erasure power set to be 6 mW.

Figure 1A:
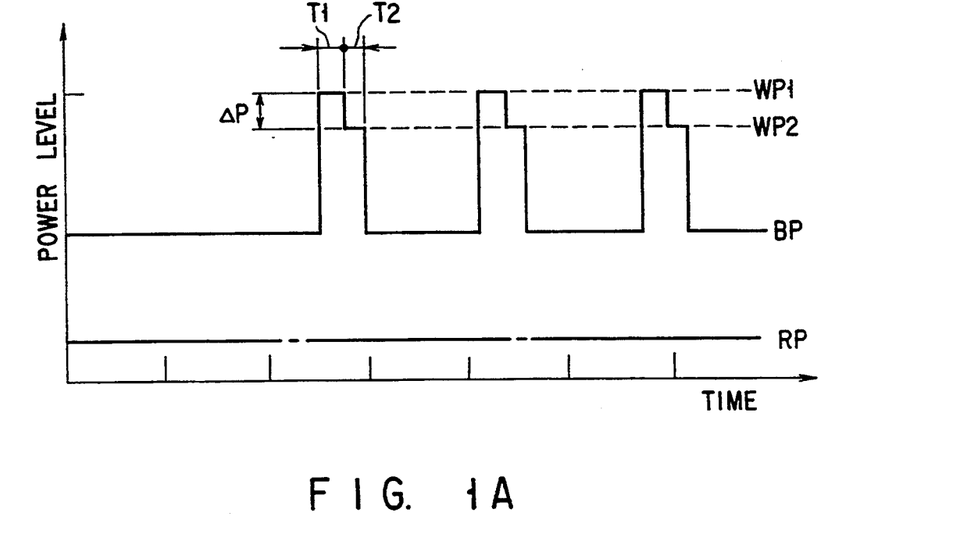
FIGS. 1A and 1B are waveform charts for explaining methods of changing a power level stepwise in a method of recording information according to an embodiment of the present invention.

Characteristics obtained when a first recording power waveform according to the present invention is used will be described below. The recording power waveform shown in FIG. 1A was used as a recording power waveform, a duration T1 of a first recording level WP1 was set to be 60 ns, and a difference AP between the first recording power level WP1 and a second recording power level WP2 of the duration T2 was set to be 2 mW. In this state, in random data recording, erasure power characteristics are represented by A2 in FIG. 8, and recording power characteristics are represented by B2 in FIG. 9.

Figure 8:
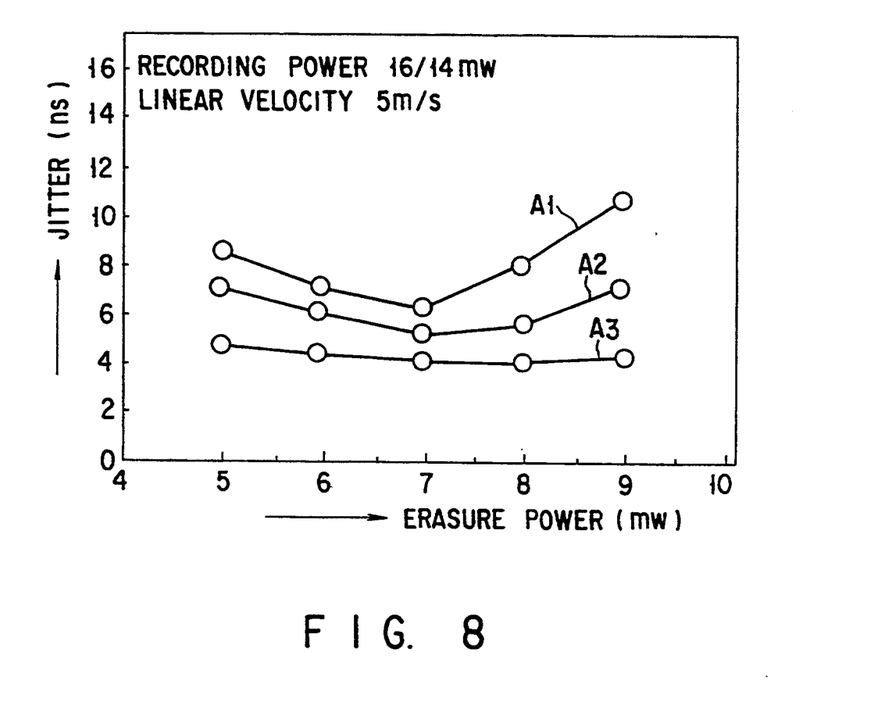
FIG. 8 is a graph showing a relationship between an erasure power and a jitter (phase shift) amount in the second and third embodiments, compared with that in the prior art.
Figure 9:
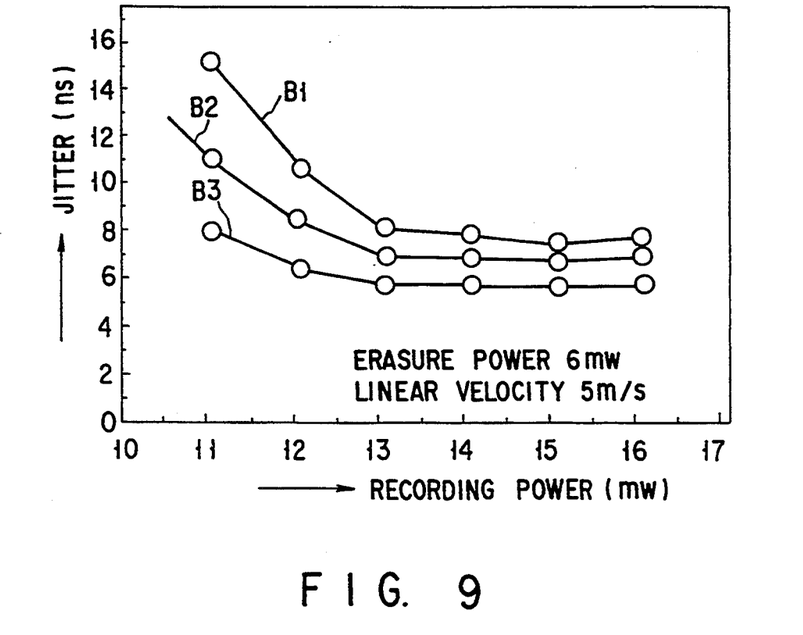
FIG. 9 is a graph showing a relationship between a recording power and a jitter amount in the second and third embodiments, compared with that in the prior art.

As is apparent from FIGS. 8 and 9, a jitter amount in the recording of the present invention is smaller than that of conventional rectangular waveform recording, and recording having a small increase in jitter amount can also be performed even in the presence of variations in recording/erasure power levels. In addition, when the same experiment as described above was performed at an optimal power level while a channel frequency was changed such that a mark length was set to be 1 μm at a linear velocity of up to 20 m/s, it was confirmed that a jitter amount of the present invention was smaller than that of the prior art in any range.

The third embodiment will be described below.

Characteristics obtained when a second recording power waveform according to the present invention is used will be described below. The recording power waveform shown in FIG. 1B was used as a recording power waveform, a duration T1 of a first recording level WP1 was set to be 60 ns, a difference AP between the first recording power level WP1 and a second recording power level WP2 of t2 was set to be 2.5 mW, a correction power level LP was set to be 3 mW, and a duration T4 of the correction power level LP was set to be 30 ns. In this state, in random data recording, erasure power characteristics are represented by A3 in FIG. 8, and recording power characteristics are represented by B3 in FIG. 9.

As is apparent from FIGS. 8 and 9, a jitter amount in the recording of the present invention is considerably smaller than that of conventional rectangular waveform recording, and recording having a small increase in jitter amount can be performed even in the presence of variations in recording/erasure power levels. In addition, as in the second embodiment, when the same experiment as described above was performed at an optimal power level while a channel frequency was changed such that a mark length was set to be 1 μm at a linear velocity of up to 20 m/s, it was confirmed that a jitter amount of the present invention was smaller than that of the prior art in any range.

The fourth embodiment will be described below.

In this embodiment, an optical disk was rotated at a linear velocity of 9 m/s, and recording was performed while the optical disk was subjected to focus servo control and tracking servo control. The same (1, 7) code modulation as described above was performed as a modulation method of recording, and the recording power waveform shown in FIG. 1B was used as a recording power waveform. A first recording power level WP1 of T1 was set to be 15 mW, a second recording power level WP2 of T2 was set to be 13 mW, a reproduction power level (read power level) RP was set to be 1.5 mW, a duration T4 of a correction power level LP was set to be 50 ns which was shorter than the period of a channel frequency, and overwrite recording of random data was performed ten times. In this case, FIG. 10 shows jitter characteristics as a function of a ratio of a difference between the correction power level LP and the reproduction power level RP to a difference between an erasure power level BP and a reproduction power level RP.

Figure 10:
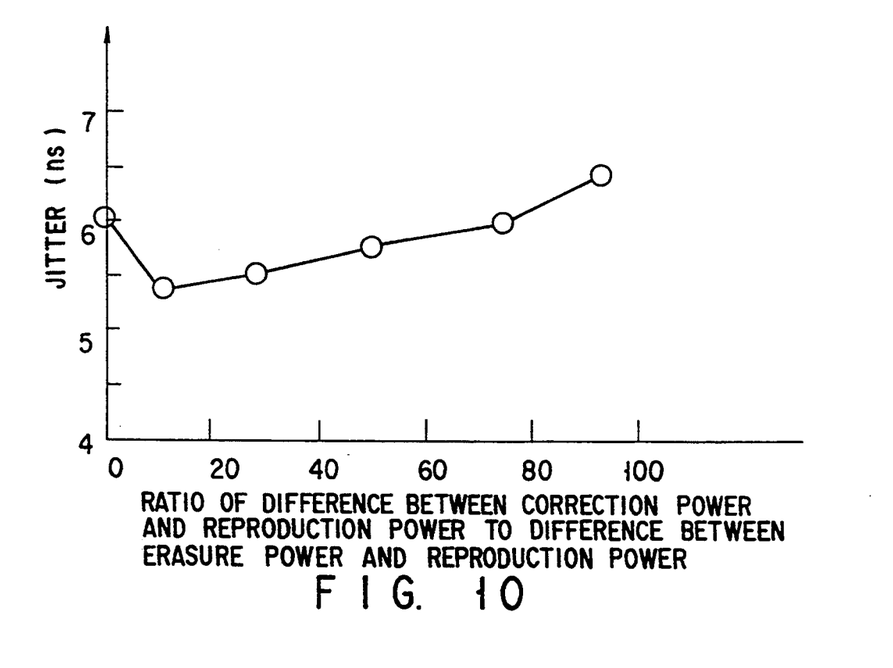
FIG. 10 is a graph showing a jitter amount as a function of a ratio of a difference between an erasure power level and a reproduction power level to a difference between a correction power level and the reproduction power level in the fourth embodiment.

As is apparent from FIG. 10, when the ratio of the difference between the correction power level LP and the reproduction power level RP to the difference between the erasure power level BP and the reproduction power level RP fell within a range of 10% to 80%, a preferable result, e.g., a jitter amount of 6 ns or less, was obtained. When overwrite recording is to be performed, if the correction power level LP has a long duration and low power level, incomplete erasure occurs to increase a jitter amount. In addition, if the correction power level LP is excessively high, the rear end portion of each mark is distorted to increase a jitter amount. In this manner, when the correction power level LP is set to be an optimal value, a jitter amount can be suppressed to be small.

The fifth embodiment of the present invention will be described below.

Figure 1B:
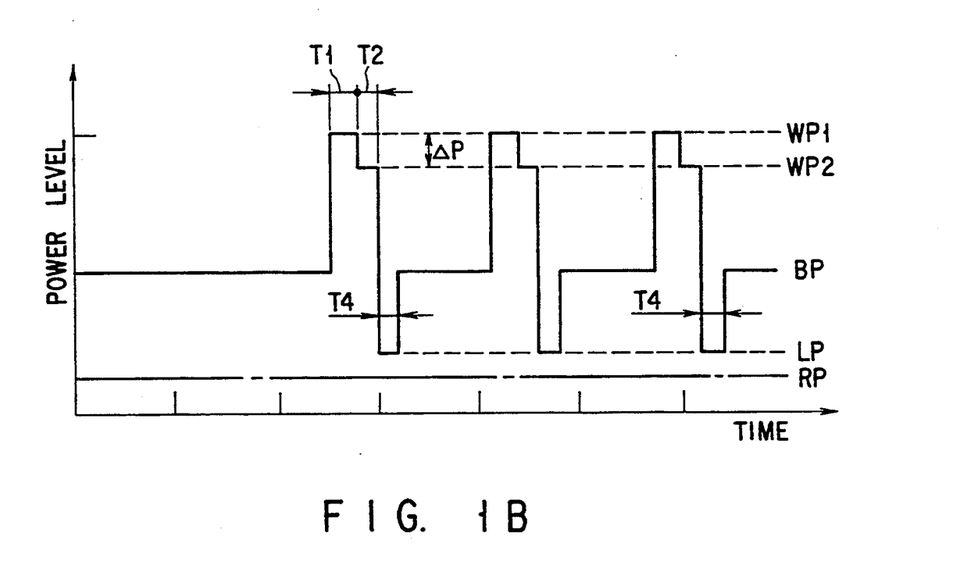

In this embodiment, the optical disk was rotated at a linear velocity of 8 m/s, and recording was performed while the optical disk was subjected to focus servo control and tracking servo control. The same (1, 7) code modulation as described above was used as a modulation method of recording, and the recording power waveform in which a recording power was changed in two power levels higher than an erasure power level BP as shown in FIG. 1B was used as a recording power waveform. A jitter amount as a function of the duration of a first step power level in the duration of all recording power levels was evaluated.

Note that the correction power level LP was set to be 3 mW, and a duration T4 of the correction power level LP was set to be 30 ns. The duration of all the recording power levels was 150 ns, 300 ns, or 600 ns corresponding to the 1, 4, or 7 code in the (1, 7) modulation, and information was recorded by a single code.

Figure 11:
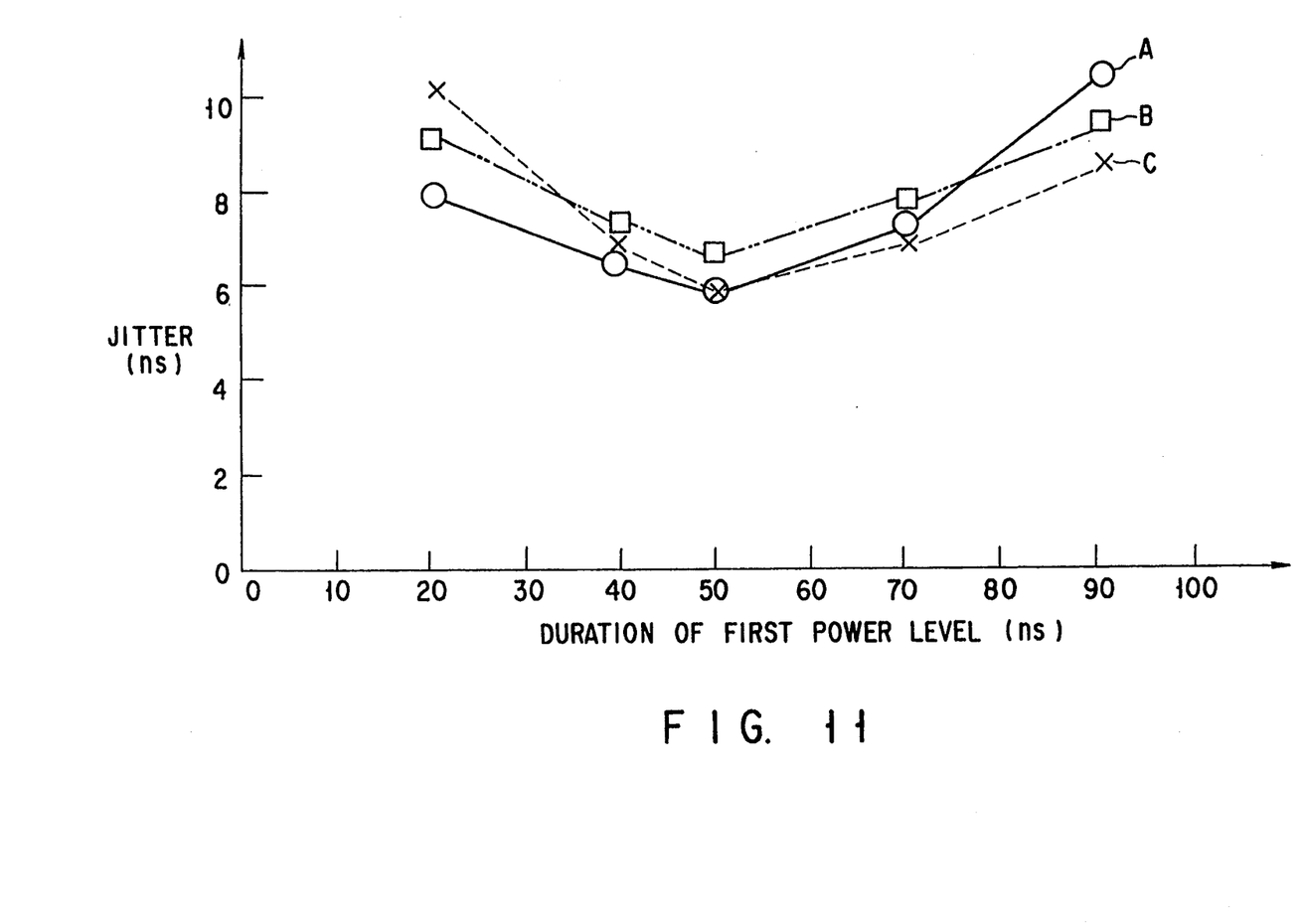
FIG. 11 is a graph showing a jitter amount as a function of the duration of a first step power level in the duration of all recording power levels in the fifth embodiment.

As shown in FIG. 11, when the first step power level of T1 is constant in each code, an optimal duration exists, and a jitter amount of this embodiment can be smaller than that of a rectangular wave (corresponding to 100% in FIG. 11). In FIG. 11, a characteristic curve A represents a case wherein the duration of all the recording power levels is 150 ns, a characteristic curve B represents a case wherein the duration of all the recording power levels is 300 ns, and a characteristic curve C represents a case wherein the duration of all the recording power levels is 600 ns.

The sixth embodiment will be described below.

In this embodiment, the optical disk 31 was rotated at a linear velocity of 8 m/s, and recording was performed while the optical disk 31 was subjected to focus servo control and tracking servo control. The same (1, 7) code modulation as described above was used as a modulation method of recording, and the recording power waveform in which a recording power was changed stepwise in two power levels higher than an erasure power level BP as shown in FIG. 1B was used as a recording power waveform. A jitter amount as a function of a ratio of the duration of a first step power level to the duration of all recording power levels was evaluated.

Note that the correction power level LP was set to be 3 mW, and a duration T4 of the correction power level LP was set to be 30 ns. The duration of all the recording power levels was 150 ns, 300 ns, or 600 ns corresponding to the 1, 4, or 7 code in the (1, 7) code modulation, and information was recorded by a single code.

Figure 12:
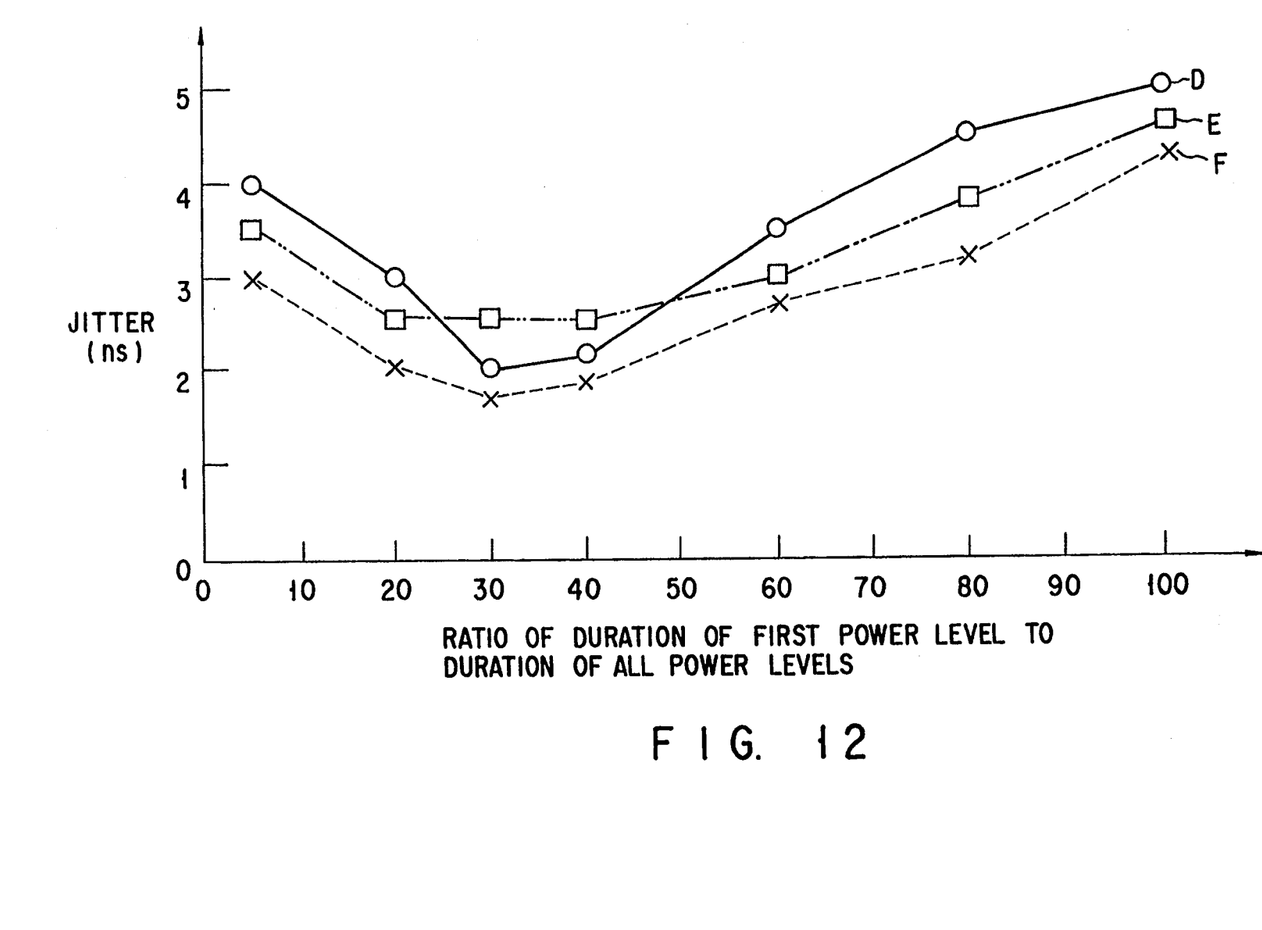
FIG. 12 is a graph showing a jitter amount as a function of a ratio of the duration of the first step power level to the duration of all the recording power levels in the sixth embodiment.

As shown in FIG. 12, when the duration of all the power levels is 5% to 70% in each of the codes, a jitter amount is 5 ns or less. In FIG. 12, a characteristic curve D represents a case wherein the duration of the all recording power levels is 150 ns, a characteristic curve E represents a case wherein the duration of all the recording power levels is 300 ns, and a characteristic curve F represents a case wherein the duration of all the recording power levels is 600 ns.

As described above, when the duration of the first step power level is changed by a change in duration of all the power levels, jitters in each of the above cases can be smaller than that in the method in which the first power level is kept constant as described in the fifth embodiment, and all the jitters can be decreased.

As has been described in detail, according to the present invention, the recording power of an energy beam radiated to record information is changed stepwise in two or more power levels higher than an erasure power level of energy beam radiated to erase the recorded information. In this case, for example, an energy beam having a high power level is radiated on a recording start portion to cause the position to abruptly generate heat and melt the recording layer of a recording medium, and the power level of the energy beam is decreased from an intermediate recording portion in consideration of the heat accumulation effect of the recording start portion. In this manner, a heat amount is uniformed on the recording layer, distortion of each mark shape is suppressed, and errors and jitters are decreased, thereby providing a method and apparatus for recording information capable of recording information at high precision.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method for forming one optical mark to record information on a recording medium, wherein said optical mark may be erased from the recording medium by applying a first light beam having a first energy intensity BP and said optical mark may be reproduced from the recording medium by applying a second light beam having a second energy intensity RP lower than the first energy intensity BP, said method comprising the steps of:

a first irradiating step for irradiating a third light beam having the third energy intensity higher than the first energy intensity BP;

a second irradiating step for continuously irradiating a fourth light beam having a fourth energy intensity lower than the third energy intensity and higher than the first energy intensity BP after the irradiation of the third light beam; and a third irradiating step for continuously irradiating a fifth light beam having a fifth energy intensity LP satisfying the following equation after the irradiation of the fourth light beam.

$$0.1 \leq \frac{LP - RP}{BP - RP} \leq 0.9.$$

2. The method of claim 1, further comprising maintaining a duration of the third light beam to be constant regardless of the lengths of the optical mark formed in said recording medium.

3. The method of claim 1, further comprising setting a duration of the third light beam to be shorter than a duration of a shortest mark of the marks formed in said recording medium.

4. The method of claim 1, further comprising setting a duration of the third high beam to be within a range of 5% to 70% of a duration of the recording operation of the one optical mark in said recording medium.

5. The method of claim 4, wherein a duration of the third light beam is longer than that of the fifth light beam.

6. The method of claim 1, wherein the fourth energy intensity has an energy intensity of about 12.5 to 13 milliwatts.

7. The method of claim 1, wherein the third energy intensity has an energy intensity of about 15 milliwatts.

8. The method of claim 1, wherein the third light beam has a duration of about 60 nanoseconds.

9. The method of claim 1, wherein the fifth light beam has a duration of about 30 nanoseconds.

10. An apparatus for recording information in which an energy beam, output from an energy beam generating means is radiated on a recording medium to change optical characteristics so as to record information represented by lengths of optical marks formed in said recording medium, comprising:

recording drive current generating means, in which drive current values corresponding to a plurality of recording power levels of the energy beam radiated to record information in said recording medium are set in advance, for generating a plurality of recording drive currents;

erasure drive current generating means, in which a drive current value corresponding to an erasure power level of an energy beam radiated to erase the information recorded in said recording medium is set in advance, for generating an erasure drive current;

correction power drive current generating means, in which a drive current value corresponding to an energy beam having a power level lower than the erasure power level of the energy beam radiated to erase the information recorded in said recording medium and higher than a reproduction power level of an energy beam radiated to reproduce the information recorded in said recording medium is set in advance, for generating a correction power drive current immediately after the energy beam radiated to record the information in said recording medium;

timing generating means for sequentially outputting timing signals for determining output timings of the recording power level;

selecting means for sequentially selecting outputs from said recording drive current generating means in response to the timing signals output from said timing generating means;

adding means for adding an output, selected by said selecting means, from said recording drive current generating means and an output from said erasure drive current generating means or said correction power drive current generating means; and means for controlling to drive said energy beam generating means in accordance with an output from said adding means.

11. An apparatus according to claim 10, wherein said recording drive current generating means includes means for generating a recording drive current having at least first and second levels, the first level being set to be higher than the second level.

* * * * *